F. E. WEBNER.
MECHANICAL CALCULATOR.
APPLICATION FILED SEPT. 13, 1907.

1,026,064.

Patented May 14, 1912.
11 SHEETS—SHEET 2.

Witnesses
Inventor
Frank E. Webner

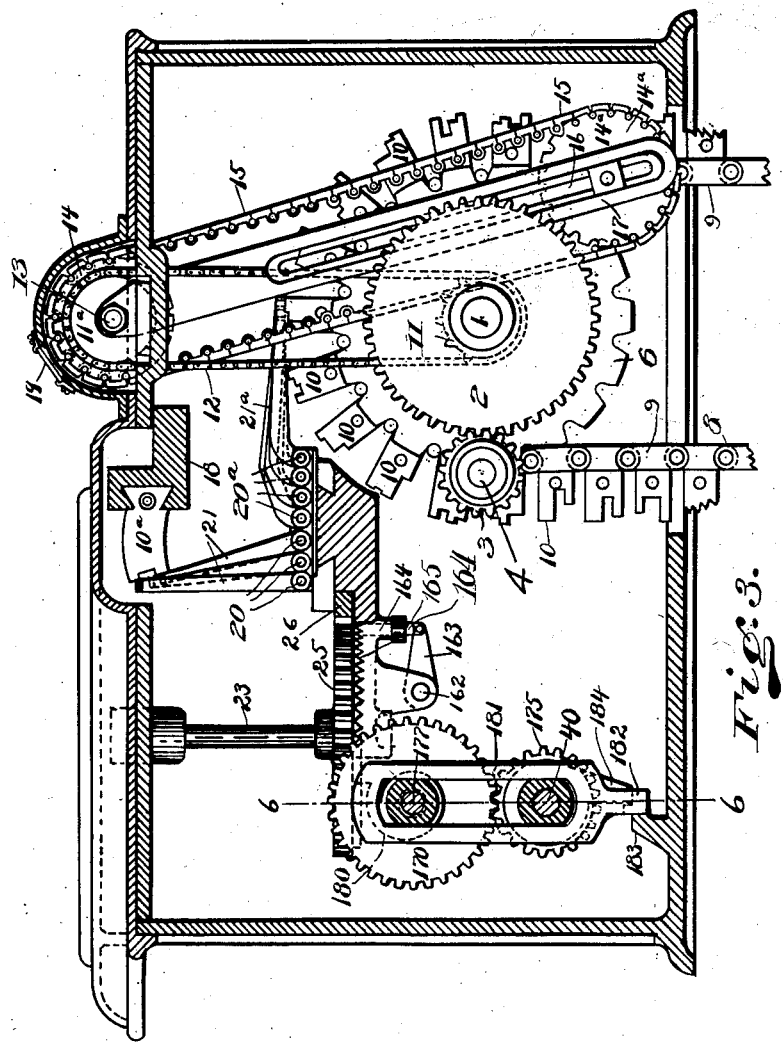

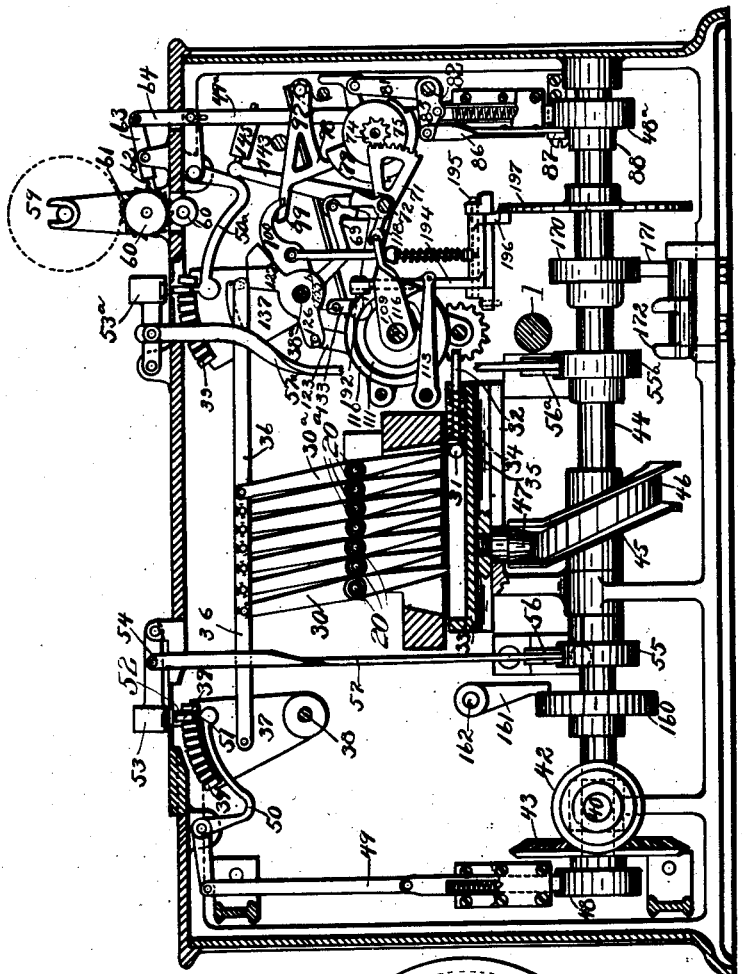

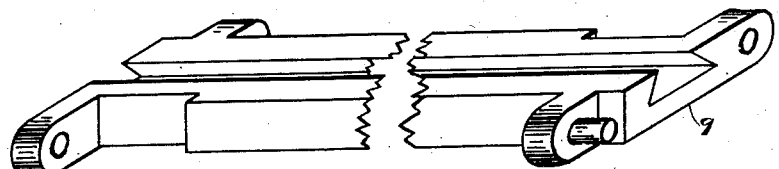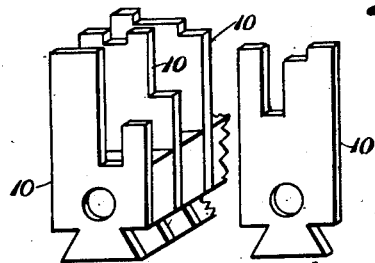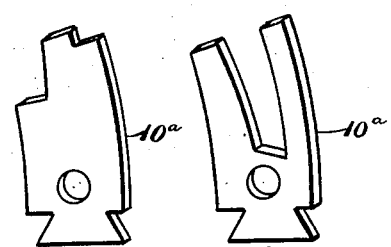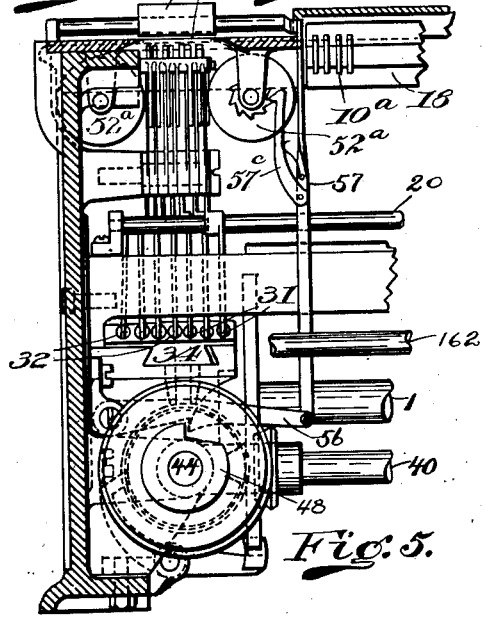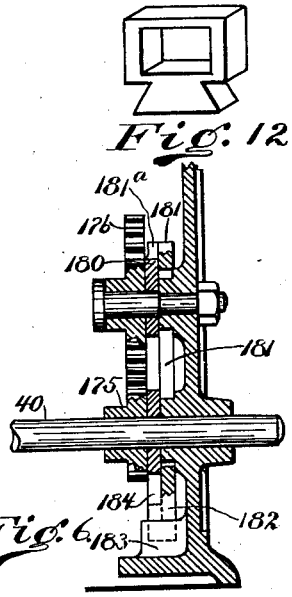

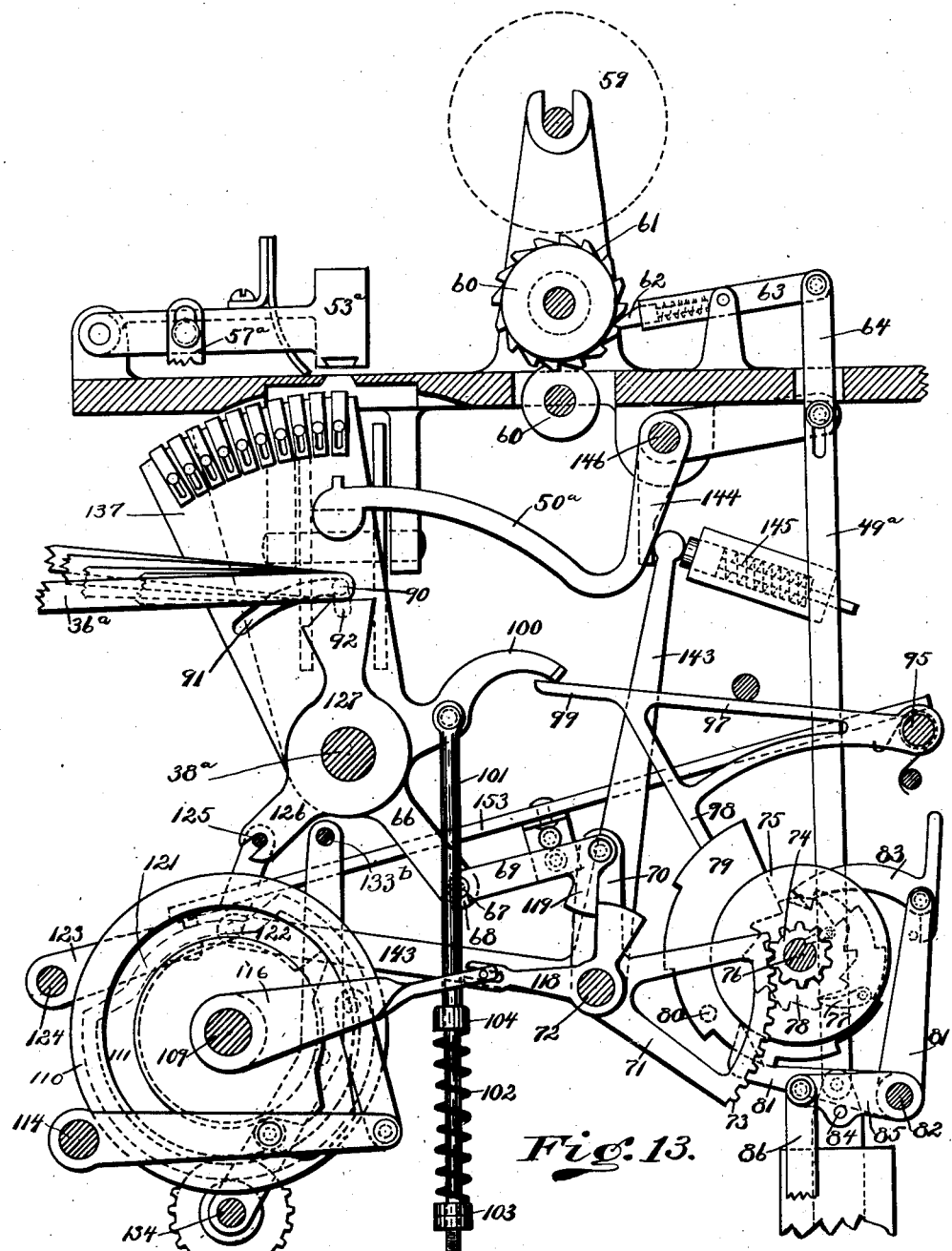

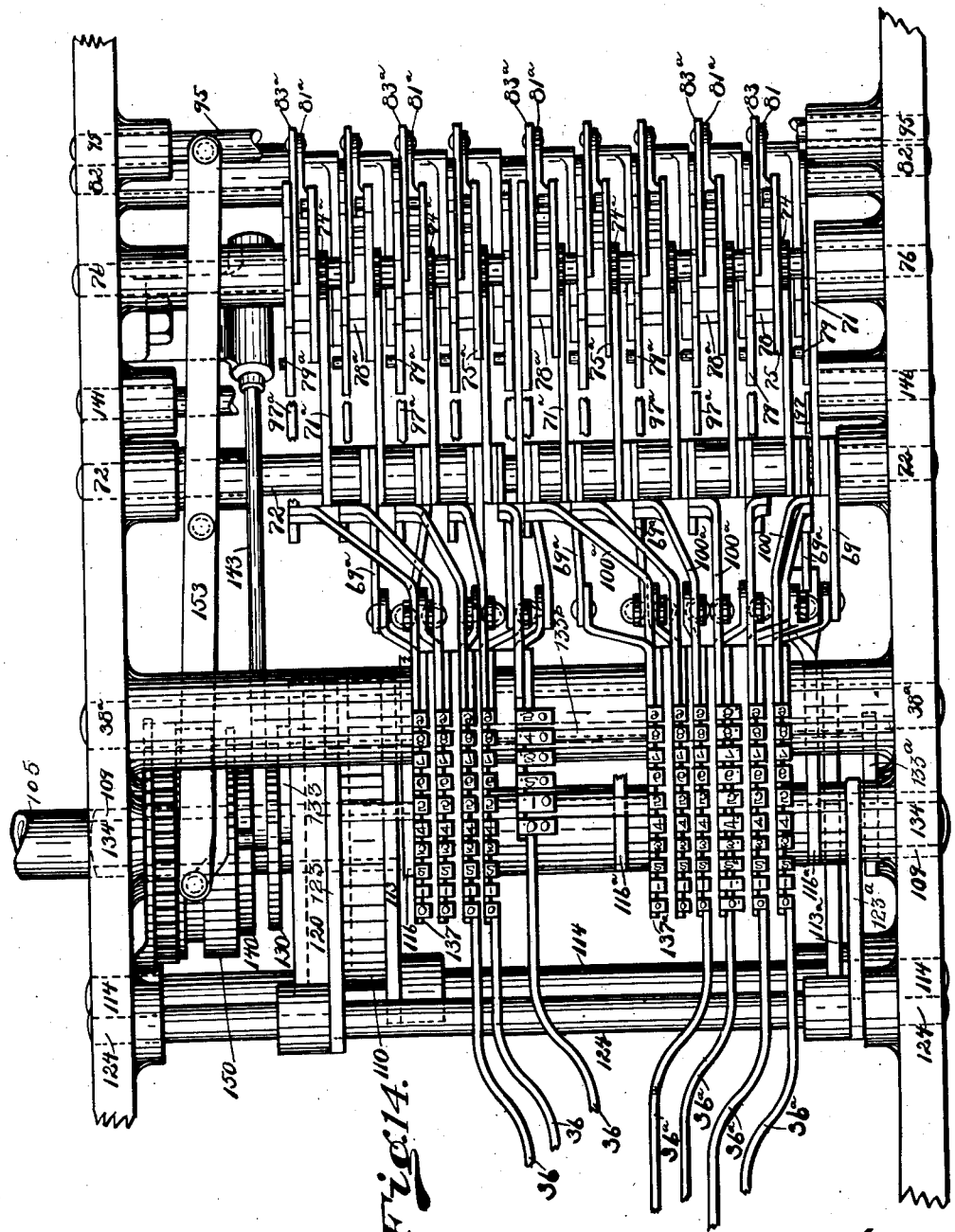

F. E. WEBNER.
MECHANICAL CALCULATOR.
APPLICATION FILED SEPT. 13, 1907.
1,026,064.
Patented May 14, 1912.
11 SHEETS—SHEET 8.
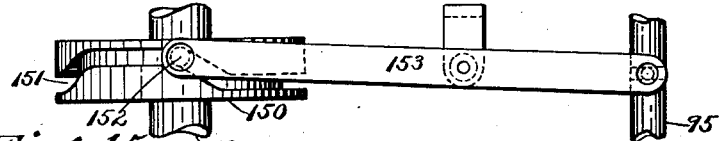
Fig. 15.
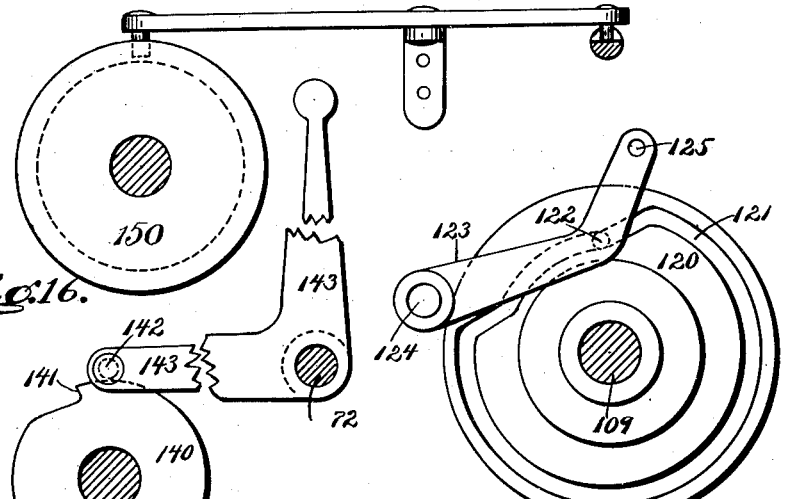
Fig. 16.
Fig. 18.
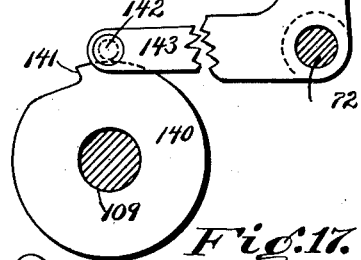
Fig. 17.
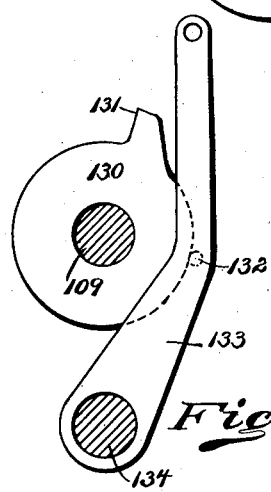
Fig. 19.
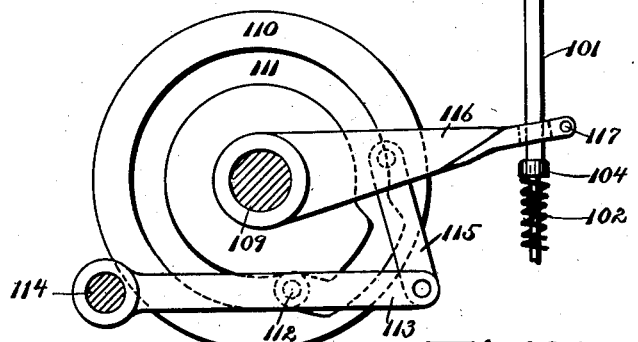
Fig. 20.
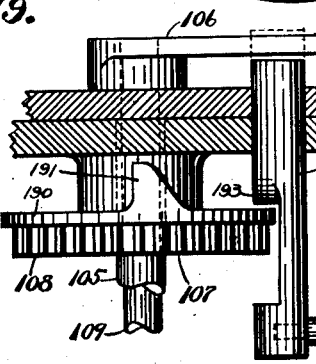
Fig. 21.
Witnesses
Inventor
Frank E. Webner

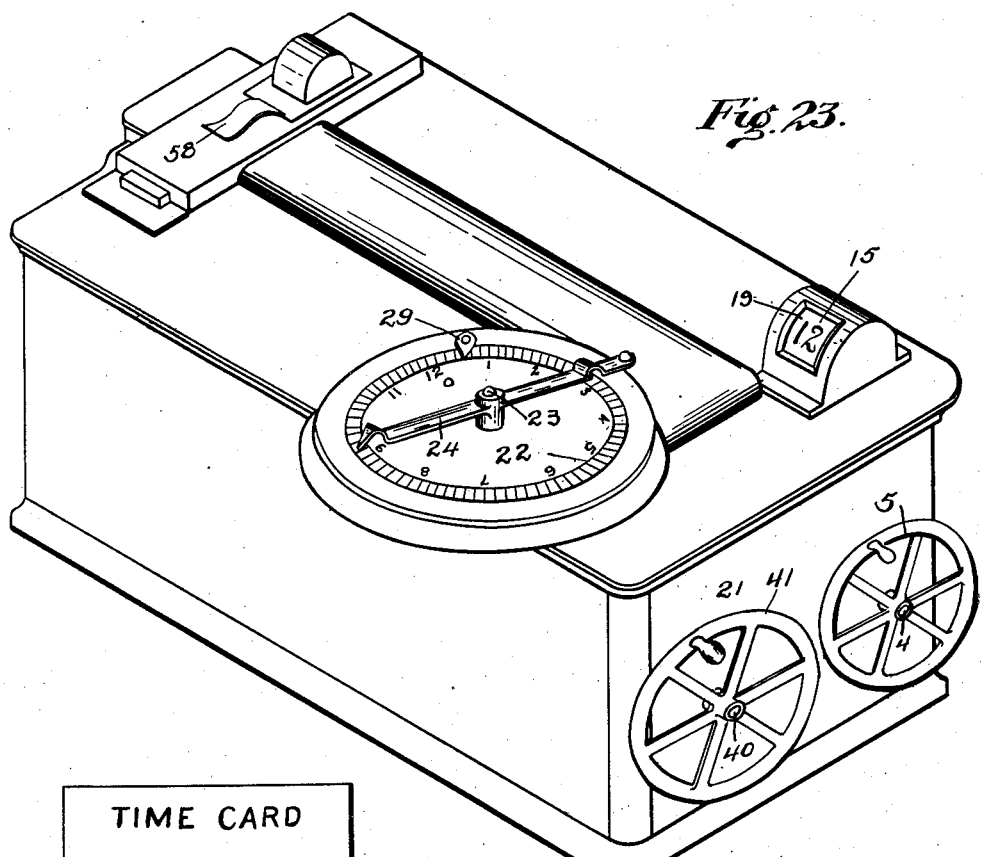

F. E. WEBNER.
MECHANICAL CALCULATOR.
APPLICATION FILED SEPT. 13, 1907.

1,026,064.

Patented May 14, 1912.
11 SHEETS—SHEET 10.

Witnesses
C. M. Palmestick
W. W. Symmes

Inventor
Frank E. Webner,
By George B. Gartner,
Attorney

F. E. WEBNER.
MECHANICAL CALCULATOR.
APPLICATION FILED SEPT. 13, 1907.

1,026,064.

Patented May 14, 1912.
11 SHEETS—SHEET 11.

Witnesses

Inventor
Frank E. Webner,
By George B. Ostrander,
Attorney

UNITED STATES PATENT OFFICE.

FRANK E. WEBNER, OF NORWOOD, OHIO, ASSIGNOR TO THE AMERICAN MECHANICAL CALCULATOR COMPANY, OF CINCINNATI, OHIO.

MECHANICAL CALCULATOR.

1,026,064.  Specification of Letters Patent.  Patented May 14, 1912.

Application filed September 13, 1907. Serial No. 392,746.

*To all whom it may concern:*

Be it known that I, FRANK E. WEBNER, a citizen of the United States, resident of Norwood, county of Hamilton, and State of Ohio, have invented a certain new and useful Improvement in Mechanical Calculators, of which the following is a specification.

The objects of my invention are to provide novel, simple and efficient means for mechanically calculating elapsed time or making other calculations involving subtractions; means for mechanically calculating wages, or prices, or making other multiplications; means for printing the results on slips representing single transactions; means for printing the results on record strips; means for adding the results; means for mechanically calculating the totals; means for printing the totals; and to produce calculating mechanism which requires no mathematical calculations on the part of the operator, and which dispenses with the use of key boards or equivalent devices which require manipulation for each digit of the number to be added or multiplied.

My invention consists in the parts and combination and arrangement of parts hereinafter described and claimed.

Figure 1:
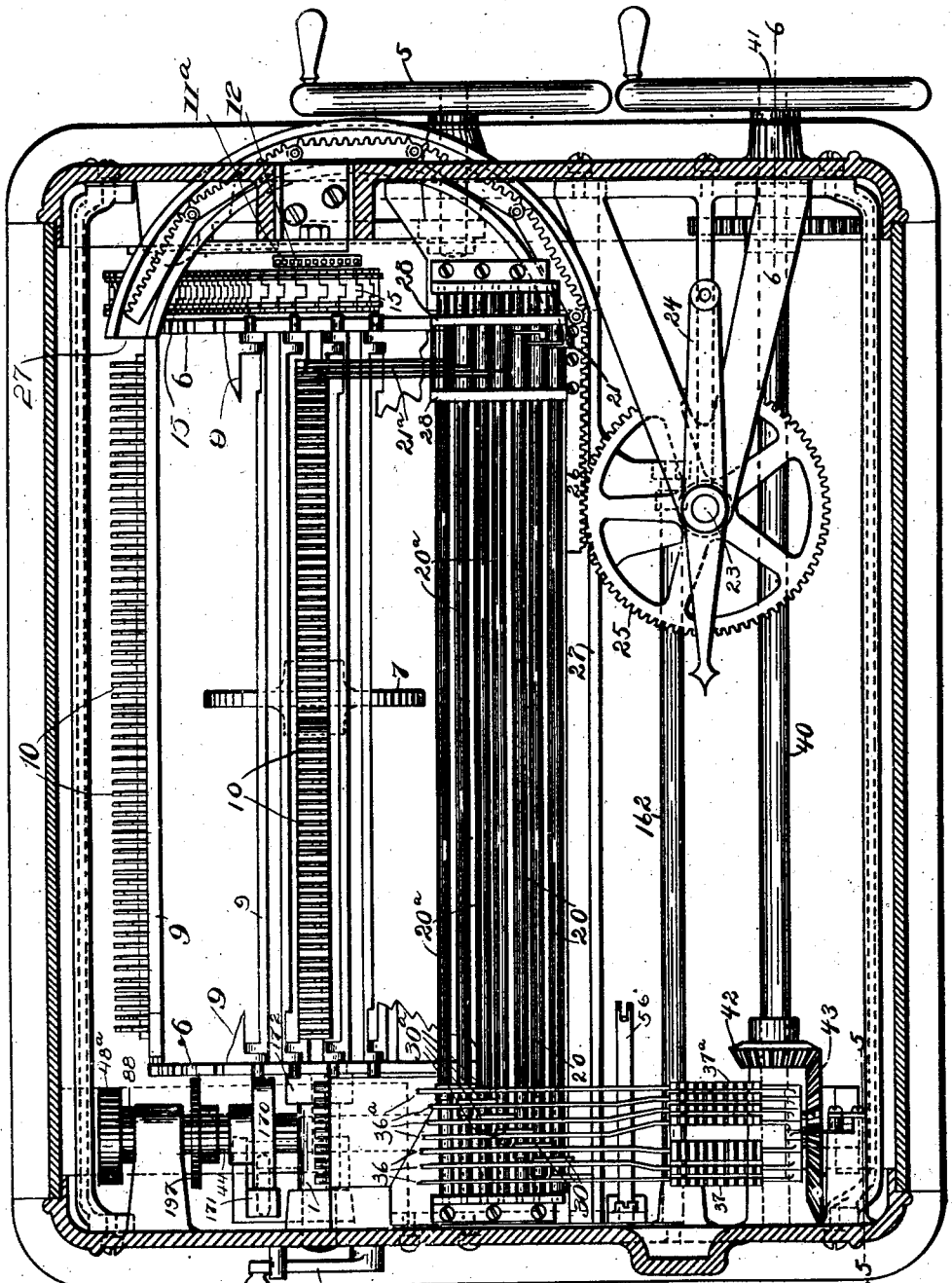
Figure 2:
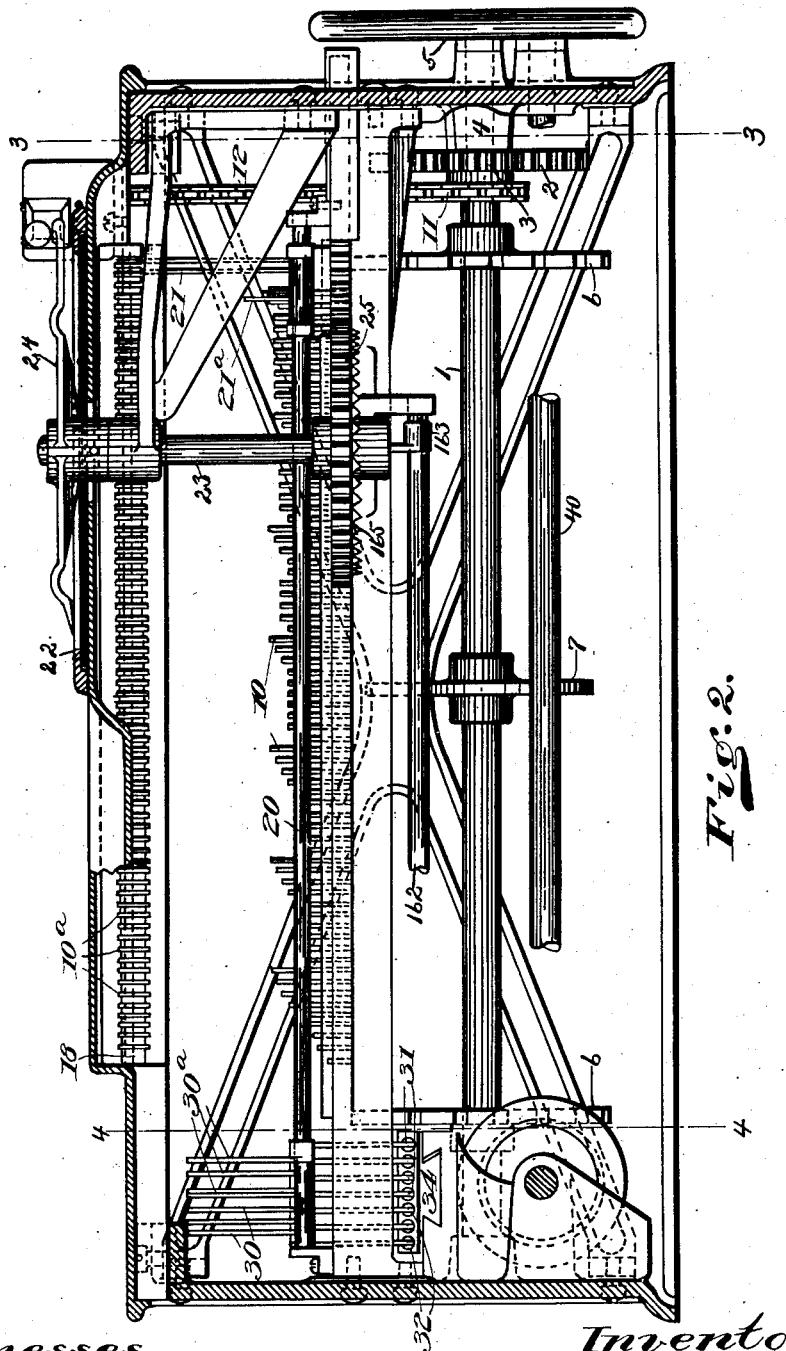
Figure 27:
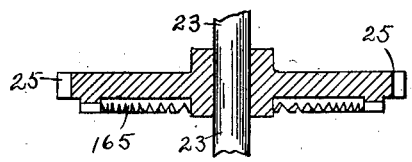
Figure 26:
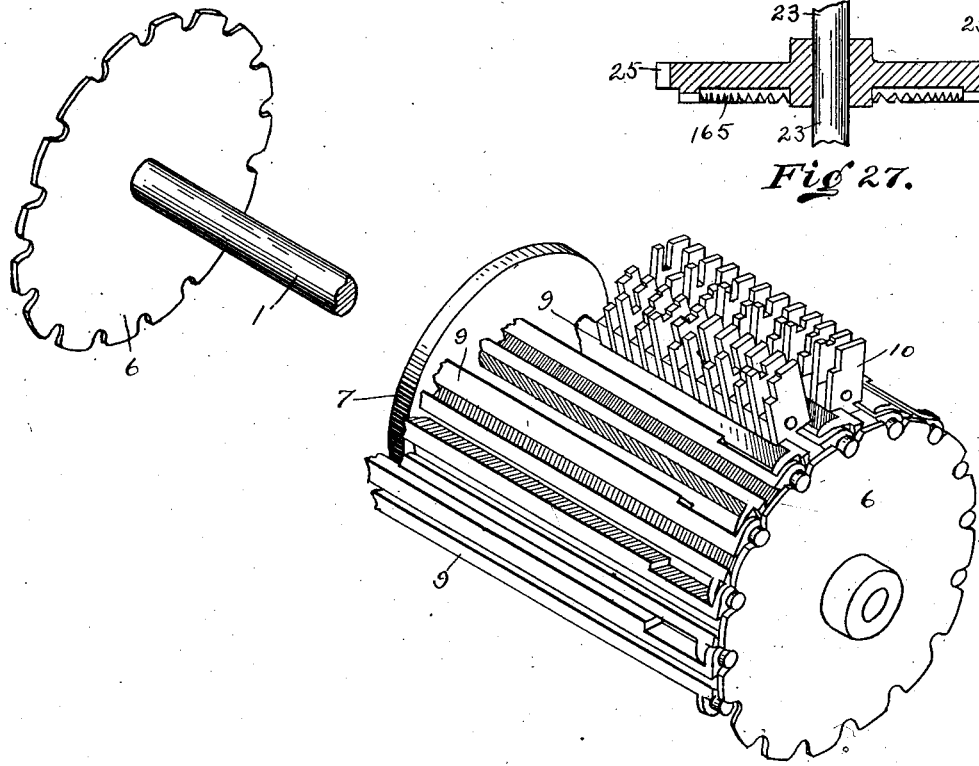
Figure 28:
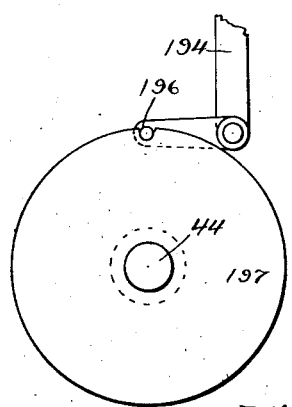
Figure 30:
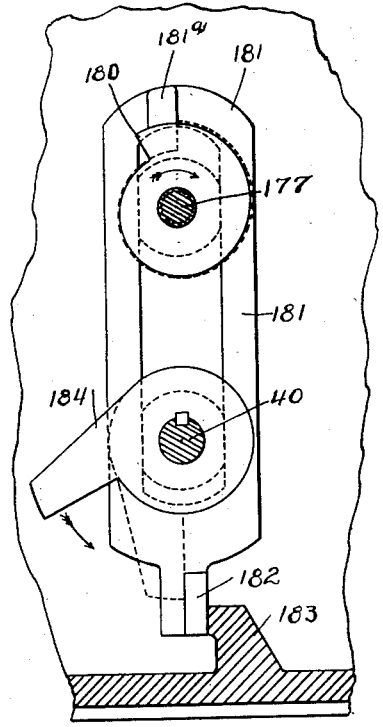
Figure 29:
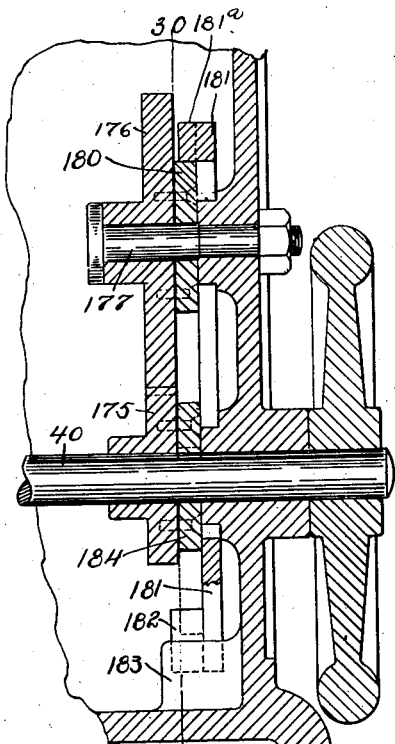
Figure 31:
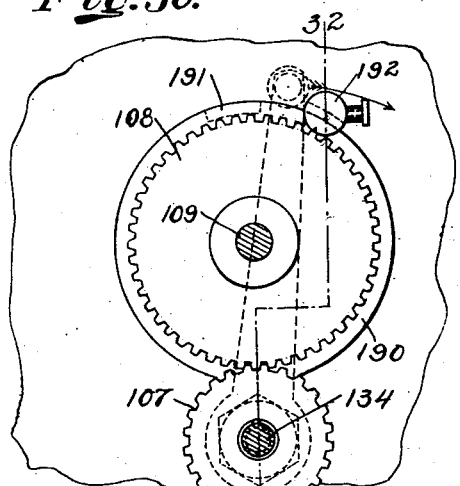
Figure 32:
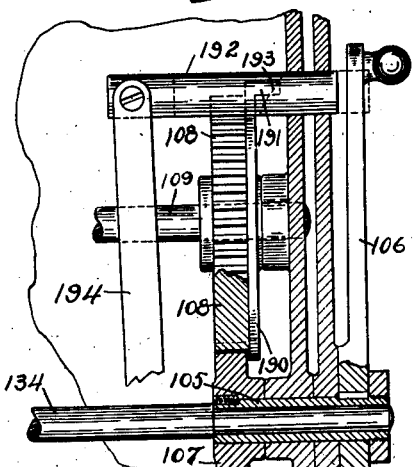

In the drawings Figure 1 is a plan view with the top of the casing removed and the adding and totaling mechanism omitted; Fig. 2 a front longitudinal sectional elevation but not showing the mechanism beyond line 4—4 of said figure; Fig. 3 a sectional elevation on line 3—3 of Fig. 2; Fig. 4 a sectional elevation on line 4—4 of Fig. 2; Fig. 5 a detailed sectional elevation on line 5—5 of Fig. 1; Fig. 6 a section on line 6—6 of Fig. 3; Figs. 7 to 12 details of the carriers, stepped elements and spacing block; Fig. 13 an end elevation of the adding, recording and totaling mechanism; Fig. 14 a plan view of the adding and totaling mechanism; Figs. 15 to 21 details of totaling mechanism and Fig. 22 a plan view of the dial plate; Fig. 23 a perspective view of the machine as it appears in its casing; Fig. 24 a face view of a workman's time card; Fig. 25 a face view of a part of the record ribbon; Fig. 26 a perspective view of a part of the operating mechanism; Figs. 27 and 28 details; Fig. 29, an enlarged view similar to Fig. 6; Fig. 30 a section on the line 30—30 of Fig. 29; Fig. 31 an elevation of the mechanism shown in Fig. 21; Fig. 32 a section on the line 32—32 of Fig. 31.

I have illustrated my invention as applied to wage computation upon the time system, but it is equally applicable to wage computation upon the piece system or to price computation, or to any computation wherein it is practicable to deal with a selected number of multipliers and multiplicands. For convenience the wage rate will be treated as the multiplicand, the elapsed time as the multiplier and the product obtained by multiplication of the figures denoting the wage rate, by the figures denoting any period of elapsed time as the multiple. When the time system is employed it is not usual to count periods of less than ten minutes and I have selected as an exemplification a machine in which the lowest unit of time counted is ten minutes, and which is designed to ascertain and print products not exceeding four figures, but it will be understood that the range of work can be readily increased without departing from the plan of operation.

The machine is so constructed that by turning a hand wheel 5 (Figs. 1 and 23) it may be set for dealing with any one of a selected number of wage rates. A rotatable dial plate 22 graduated to represent hours and fractions thereof is turned to bring the time of beginning work as indicated by the workman's time card, and by the dial plate opposite a fixed pointer 29. Then by moving a hand bar 24 to a position relatively to the dial plate which indicates the time of finishing work as shown by the time card, the mechanism is positioned for printing the elapsed time and the wage for that time. By turning a hand wheel 41 two revolutions, the elapsed time and the wage for that time is printed upon the time card and upon a record strip, the adding mechanism actuated and the mechanism restored to position for another computation. By turning a hand bar 106 (Fig. 21) two revolutions, the time and wage computing and adding mechanism may be disconnected, the totals printed, and the mechanism restored to position for another computation.

*Multiplicands, multipliers, and multiples.*—The numeral 1, (Figs. 2, 3) indicates a shaft, extending longitudinally of the frame, and carrying a gear 2 meshing with a gear 3 mounted on a stud shaft 4 which is provided with a hand wheel 5 by which, through the connecting mechanism, rotary motion may be imparted to shaft 1. Fixed to shaft 1 are sprocket wheels 6 and a supporting wheel 7. The sprocket wheels carry a sprocket chain or carrier 8 (Fig. 3) consisting of a series of bars 9 including a bar for each wage rate, or multiplicand to be dealt with. The wheel 7 affords an additional support for the carrier chain. The bars are arranged in sequence, that for the lowest wage rate being first, that for the next higher rate next, and so on through the series. Upon each wage bar is mounted, preferably in dovetailed mortises, (Figs. 3, 7–9) a series of stepped blocks 10 in which the steps are arranged in accordance with a scale in which steps of different heights, or distance from the base, correspond with the numerals and in which the position of the step laterally determine the order of the corresponding numeral, that is: whether it is to count as units, tens, hundreds or thousands. If we assume that the unit of the scale is a half inch, that the highest step or stop is six and one half inches from the base and that the highest stop corresponds with naught, then a stop six inches from the base will correspond with one, a five and a half inch stop with two, a five inch stop with three, a four and a half inch stop with four, etc., the lowest stop being two inches from the base and corresponding with nine. The stops are equally spaced from side to side. Assuming that the space at the right (the blocks are reversible) corresponds with units, a step in the next space to the right will correspond with tens, the next space with hundreds, etc., the position of the stop laterally, serving a purpose analogous to that of columns in dealing with actual figures. With this arrangement a block having a six inch stop, at the left, follows, from left to right, by a five inch stop, a four inch stop, and a three inch stop, would correspond, in an arbitrary way with the numerals 1357 or, if the block is reversed, with 7531. Four six inch stops, or a flat top six inches from the base would correspond with 1111, four two inch stops with 9999, a two inch stop, followed by a six and a half inch stop, a two inch stop and a six and a half inch stop, with 9090. It will be noted that by this system a block with four steps may be made to correspond, in an arbitrary way, with any number up to 9999. In like manner a block with five steps might be made to correspond with any number up to 99999, etc. These blocks serve as elements of type selecting mechanism, the steps serving as stops to limit the motion of arms or fingers which, through intermediate mechanism control the position of type carriers and determine whether one or another group of figures shall be printed. While neither the stops nor the blocks serve as indicators or carry any numerals, it will be convenient to speak of them as " denoting " the numerals or the series of numerals with which they correspond. Each block has a step for units, a step for tens, etc., and the steps in each block in a series are arranged to correspond with or denote numerals which represent a multiple of the wage rate for which that series stands. The blocks in each series are arranged in sequence on the wage bar which stands for that wage rate, the block denoting the lowest multiple being first, that denoting the next higher next, etc. For example, taking twelve as the wage rate, the first block on the bar carrying that series will be stepped to denote 0002 (or 2 cents), which is the wage for the lowest period of time generally taken into account, the next to denote 0004 (or 4 cents), the next to denote 0006 (or 6 cents) etc., the last block being stepped to denote 0144 (or $1.44, the wage for twelve hours.)

The sprocket chain, or carrier, is preferably merely suspended from the sprocket wheels 6 and supporting wheel 7 and extends loosely through the bottom of the casing to permit increasing the number of bars to adapt the machine for use with any desired number of wage rates.

Fixed upon shaft 1 is a third sprocket wheel 11, carrying a sprocket chain 12, which takes over and is adapted to actuate a sprocket wheel 11$^a$ mounted upon a shaft 13 which carries another sprocket wheel 14, which in turn carries another sprocket chain 15, the links of which carry numerals indicating wage rates corresponding with those denoted by the wage bars and arranged in like sequence. The indicator chain takes over another sprocket wheel 14$^a$ preferably slidably mounted so that the number of links in the chain may be readily increased or decreased to correspond with the number of wage rates and wage bars required. In the form shown, sprocket wheel 14$^a$ is adjustably mounted in a slot 16 in a fixed frame 17. A stationary bar 18 also extending longitudinally of the casing, and mounted in proximity to the path of travel of the movable bars, carries a series of stepped blocks 10$^a$ of the same general nature as the multiple blocks, but stepped to correspond with numerals denoting periods of elapsed time. Inasmuch as ten minutes is the lowest unit of time to be counted these time or multiple blocks require but three steps, one for tens of minutes, one for hours and one for tens of hours. A time block is provided for each multiple block in a series, that is: the number of time blocks equals the number of wage or multiple blocks upon one rate bar. The time blocks are also arranged in series, that stepped to denote the lowest period of elapsed time to be dealt with being first, that stepped for the next higher period of elapsed time second, etc. The blocks on the time bar are spaced and positioned to correspond with those on the rate bars. By rotating the carrier shaft 1 the bar 9 carrying blocks denoting multiples of any desired rate, or multiplicand, may be brought into juxtaposition with the bar 18 carrying blocks denoting the periods of elapsed time, or multipliers, the corresponding rate on the indicator chain being disclosed through a peep hole 19 when the position is reached.

*Type selecting mechanism.*—Extending longitudinally of the casing and in proximity to the time bar and the path of travel of the rate bars, are two series of rock shafts 20 and 20ª, (Figs. 1, 3 and 4). Upon each of the rock shafts 20 is sleeved and splined a finger arm 21, adapted to engage with one of the steps on the time blocks, and upon each of the rock shafts 20ª, is sleeved and splined a finger arm 21ª, adapted to engage with a step on the multiple blocks, the finger arms being so arranged that one of the finger arms 21 is adapted to engage the step denoting the lowest unit of time, in this case tens of minutes, and that step only, another finger arm to engage the step denoting hours and another to engage with the step denoting tens of hours, and one of the finger arms 21ª to engage the step denoting cents, another to engage the stem denoting tens of cents, etc.

Upon the casing is mounted a dial plate 22, (Figs. 2, 22) movable independently of the other mechanism and graduated in ten minute periods. In the form shown the dial plate is rotatable upon a shaft 23 upon which, above the dial plate, is fixed a hand bar 24 adapted to actuate the shaft. Fixed upon the shaft and within the casing is a cogged wheel 25, meshing with and adapted to actuate a rack bar 26 arranged to travel in a guide way 27. In the form shown the rack bar is jointed and the guide way curved in order to economize in space. The rack bar carries a frame 28 (Fig. 1) adapted to engage with the ends of the sleeves on the finger arms 21 and 21ª, and, when moved, to cause the finger arms to travel upon the rock shafts. By moving the hand bar, the shaft 23, the cogged wheel 25, the rack bar 26 and the frame 28, may be actuated, thereby moving the finger arms along the rock shafts to bring them into operative alinement with any one of the time blocks and the corresponding multiple block. The gearing is so arranged that movement of the hand bar over a ten minute period, as indicated on the dial plate, moves the frame a distance equal to that between the centers of two adjacent time or multiple blocks, etc. Inasmuch as each time block represents a period of elapsed time, in ascending series, it is only necessary to move the hand bar to the position denoting the desired period of elapsed time in order to bring the finger arms into operative alinement with the proper time and multiple blocks. To this the dial plate is set so that the pointer indicates the time of beginning work as shown by the time slip, and the hand bar moved to the position on the dial indicating the time of finishing work. It is not necessary that the operator should calculate mentally, or otherwise, the elapsed time. His only duty in this connection is to see that the dial is set to denote the time of beginning work and to turn the hand bar to the time of finishing work.

*Means for actuating the type selectors and type carriers.*—Fixed to each of the rock shafts 20 is a lever 30, (Figs. 1, 2, 4) having a downwardly extending arm provided with a knob 31 adapted to be engaged by a yielding plunger 32 carried by a movable frame 33. In the form shown, a coiled spring 34 is held between a shoulder 35 on the plunger and an abutment on the movable frame. Movement of the frame actuates the levers and consequently the rock shafts. Each of the levers 30 is connected by a link 36 with a sector 37, loosely mounted upon a shaft 38, and carrying movable type 39. Two of these sectors carry type representing numerals, from naught to nine, and one carries type representing numerals from naught to five with a cipher added, (00, 10, 20, etc.) The type on these type carriers print the time in tens of hours, hours and tens of minutes. Fixed to each of the rock shafts 20ª is a lever 30ª of like description and adapted to be actuated in the same manner as levers 30, but connected by a link 36ª with a type carrier 37ª of like character with the type carriers 37. Each of the type carriers 37ª carries type representing numerals from naught to nine, the type on the carriers representing respectively tens of dollars, dollars, tens of cents and cents.

40 (Figs. 1, 2, 3, 4, 5, 6) designates a shaft extending longitudinally of the casing and adapted to be rotated by a hand wheel 41. At the end opposite the hand wheel this shaft is connected by bevel gears 42 and 43 with a shaft 44, extending transversely of the casing, the gears being such that two rotations of the longitudinal shaft 40 cause one rotation of the transverse shaft 44. Fixed to this shaft is a cam wheel 45, having a cam slot 46, which engages with a roller 47 carried by the movable frame 33, which carries the plungers which actuate the levers 30 and 30ª. Rotation of shaft 44 and cam wheel 45 actuates frame 33, and consequently the levers 30 and 30ª, and restores them to their idle position. Actuation of the levers actuates the rock shafts 20 and 20ª and thereby throws the type selecting arms 21 and 21ª into engagement with the steps on the multiplier and multiple blocks with which they are in alinement. The steps and the type selecting arms limit the movement of the rock shafts, and consequently of the levers 30 and 30ª and the type carriers 37 and 37ª, the spring plungers 32 yielding to compensate for the difference between the then permitted limit of travel of the levers and their longest sweep. Each lever is so connected with the type carriers that, when a type selecting arm engages with a step, the lever brings the type carriers, with which it is connected, into position for printing the numeral denoted by that step.

*Printing mechanism.*—Shaft 44 also carries a cam wheel 48, upon which rides an arm 49, (Figs. 4, 5) spring pressed against the cam, and connected at its other end with a lever arm 50, carrying type hammers 51 adapted to engage with and actuate the positioned type. A movable inked ribbon 52 winding on spools 52ª is led past a slit in the casing over the operative position of the type and under a platen 53, preferably of hammer type. The platen is pivoted at 54 and arranged to be lifted by means of a cam wheel 55 on shaft 44, a notched lever arm 56 and a link 57 connecting the notched lever arm and the platen. The inked ribbon is mounted upon rollers 52 and may be actuated by a pallet 57ᶜ carried by link 57 and acting upon a ratchet wheel 52ᶜ fixed to one of the rollers 52ª. The cams are so adjusted that the hammer and the platen are tripped concurrently as the required type reach their position of use. It will be understood that a wage slip is placed over the slit under the platen before these operations.

*Recording mechanism.*—For the purpose of keeping a record of the wage or other slips printed, the links 36 and 36ª are extended to connect with type carriers 137 and 137ª (Figs. 4, 13, 14, 23). These type carriers are duplicates, so far as relates to arrangement of type, of type sectors 37 and 37ª, and they are used in connection with an inking ribbon, platen and hammers like those previously described, the hammers being operated by a lever arm 50ª, carried by a spring pressed arm 49ª, riding upon and adapted to be actuated by a cam wheel 48ª, on shaft 44. A record ribbon 58, wound upon a reel 59 is fed under the platen by rollers 60. To one of the rollers is fixed a ratchet wheel 61 adapted to be actuated by a spring pressed pawl 62 carried by a lever 63 and connected by a link 64 with the heel end of the hammer lever 50ª, whereby actuation of the hammer lever actuates the pawl.

It will be noted that the recording mechanism is driven and controlled by the mechanism which drives and controls the wage-slip printing mechanism and requires no additional operations upon the part of the attendant.

*Adding mechanism.*—The type carriers, 137 and 137ª, (Figs. 4, 13, 14) are loosely mounted upon a common shaft 38ª and each is provided with an arm 66 carrying a pin 67 adapted to be engaged by the walls of a notch 68 in an arm 69 pivoted to a lever arm 70 which extends from a frame 71 pivotally mounted on a shaft 72 and carrying a segmental rack 73. The rack meshes with and is adapted to actuate a pinion 74 fixed to, or integral with, a disk 75 loosely mounted upon a shaft 76. The disk carries a pawl 77 adapted to engage with and actuate a ratchet wheel 78 fixed to, or integral with, a stepped adding wheel 79 also loosely mounted upon shaft 76. The steps on the adding wheels, like those on the multiplier and multiple blocks, denote numerals but are arranged with the steps consecutive from the lowest to the highest. When one of the type carriers is moved into printing position, arm 66, being in engagement with pin 68 on arm 69 which is connected with lever arm 70 on the rack frame 71, retracts the lever arm thereby imparting motion to the segmental rack 73 and actuating pinion 74, which through disk 75 and pawl 77, rotates adding wheel 79 a distance proportionate to the travel of the type carrier—that is, if the type carrier moves to position for printing the numeral 1, the adding wheel is moved one step, and if the type carrier moves to position for printing the numeral 9, the adding wheel is moved nine steps. Reverse movement of the type carrier restores the segmental rack to its original position. Each adding wheel carries a pin 80 adapted to engage with and depress the horizontal arm of a crank lever 81 loosely mounted upon a shaft 82. The vertical arm of lever 81 carries a hook pawl 83 adapted to engage with the risers of the steps on the adding wheel of the next order. The horizontal arm of lever 81 is adapted to engage with and depress a pin 84 on an arm 85 fixed on shaft 82 and connected by a link 86 with a lever 87 adapted to be engaged and lifted by a cam 88 on shaft 44. When lever 81 is depressed by engagement with a carrying pin 80 on one of the adding wheels, pawl 83 is thrown forward one step and into engagement with a riser on the adding wheel. When the cam lifts lever 87 it forces link 86 and arm 85 upward, thereby raising pin 84 and restoring lever 81 to the original position. This retracts pawl 81 and moves the adding wheel for the next order of numerals one step, thereby carrying ten. Each adding wheel acts in like manner upon the one of next higher order.

It will be noted that the adding mechanism is driven and controlled by the same mechanism which drives and controls the wage-slip printing mechanism and the recording mechanism, and requires no additional operation by the attendant.

*Totaling mechanism.*—For totaling purposes, the type carriers 137 and 137ª (Fig. 13) are freed from the domination of the type selecting mechanism heretofore described and placed under the domination of other type selecting mechanism which acts upon the steps of the adding wheels, instead of upon the steps of the multiplier and multiple blocks. This requires disengagement of the links 36 and 36ª, by means of which the type carriers are positioned for recording purposes and disconnection of the arms 69 by means of which the adding mechanism is actuated. To facilitate disconnection each of the links 36 and 36ª, is provided with a pin 90 adapted to take into a curved slot 91 in the type carrier and to be engaged by the walls of a notch 92 at one end of the slot. The arms 66 and 69 have already been described as detachably connected. Mechanism for automatically disengaging and re-energizing the links 36 and 36ª, and the arms 69 will be described after description of the type selecting mechanism.

95 indicates a shaft extending transversely of the casing, mounted to slide longitudinally and held in its idle position by means of a spring 96. Upon this shaft is loosely mounted a series of angular frames 97, normally spring pressed in their idle position the series including a frame for each adding wheel. Each frame is provided with an arm 98 adapted to engage with the steps on an adding wheel and an arm 99 adapted to be engaged by an arm 100 extending from one of the type carriers. By moving the rock shaft longitudinally the type selecting frames may be thrown in or out of alinement with the arms 100 on the type carriers. Pivoted to each type carrier, 137 and 137ª, is an arm 101 carrying a spring 102 held between a nut 103 at the free end of the arm and a boss 104 slidably mounted on the arm. The type carriers being disengaged from the levers 36 and 36ª, and from the arms 69, and the type selecting frames in alinement with the arms 100, depression of the arms 101 will impart forward motion to the type carriers and bring the type selecting arms into engagement with the steps on the adding wheels which correspond with the amount obtained by the last addition. The steps limit the movement of the type selecting frames and consequently of the type carriers, and the connection is such that each type carrier is properly positioned for printing the numeral denoted by the step engaged. The springs 102 yield to compensate for the difference between the then permitted travel of the type selecting frame and its longest sweep.

Means for mechanically disengaging the type carriers from the domination of the previously described actuating mechanism, bringing them under the domination of the totaling mechanism, releasing them from the domination of the totaling mechanism, and restoring them to the domination of the previously described actuating mechanism, and the mechanism for actuating the totaling devices will now be described.

105 (Fig. 21) designates a hollow shaft adapted to be rotated by means of a hand lever 106. This shaft carries a gear 107 meshing with a gear 108 fixed to a shaft 109 mounted parallel with shaft 105, the gearing being such that two rotations of shaft 105 causes one rotation of shaft 109. Shaft 109 carries a series of cam wheels 110, 120, 130, 140 and 150. Cam wheel 110 (Figs. 13, 20) is provided with a cam groove 111 in which rides a pin or roller 112 on a lever arm 113 fixed to a rock shaft 114, and connected by a link 115, with an arm 116, pivoted on shaft 109 and carrying at its end a pin 117 which engages with a fork upon one arm of an elbow shaped dog 118 loosely mounted on shaft 72 and adapted to engage with and actuate a dog 119 depending from arm 69. Arm 116 also takes over and is adapted to engage with boss 104 on arm 101. Upon rotation of shaft 109 carrying cam wheel 110, as the roller 114 travels up the rise in the cam groove 111, it depresses lever arm 113 which, through link 115, depresses arm 116 which rocks dog 118 which engages with dog 119 and lifts arm 69 out of engagement with arm 66, thereby disconnecting the type carrier from the adding mechanism. Further travel of the roller up the incline of the cam groove further depresses arm 116, bringing it into engagement with the boss 104 on arm 101, thereby depressing arm 101, imparting motion to the type carrier, and, through arm 100, actuating a type selecting frame 97 to bring the type selecting arm into engagement with the proper step on an adding wheel. The rock shaft 114 carries a series of arms 113ª connected with and adapted to actuate arms 116ª, and performing the same general functions as the arm 113 and its connections.

Cam wheel 120 (Figs. 13, 14, 18) is provided with a cam groove 121 in which rides a pin or roller 122 on an arm 123 fixed to a rock shaft 124. The arm 123 with a corresponding arm 123ª carries a rod 125 which engages with the forked ends of lever arms 126 extending from cams 127, 127ª, etc., mounted to rock on shaft 38ª. The faces of cams 127 are adapted to engage with the pins 90 on links 36 and 36ª, lift them out of the notches 92, hold them disengaged during the totaling operation and restore them to engagement when the totaling operation is completed. Upon rotation of the cam wheel 130

120 the inward slope of the cam groove depresses arm 123, thereby rocking cam 127 into engagement with the pins 90, and the outward slope of the cam groove rocks the cam in the reverse direction, allowing the pins to drop into their engaged position. This operation is concurrent with the release and reëngagement of arm 69.

Cam wheel 130 (Figs. 13, 19) has a cam projection 131 adapted to engage with a pin or roller 132 on an arm 133 fixed to a rock shaft 134 which carries a like arm 133$^a$. The arms 133 and 133$^a$ carry a rod adapted to engage the arms 66, 66$^a$, on the type carriers and restore them to their idle position.

Cam wheel 140 (Figs. 13, 17) has a cam projection 141 adapted to engage a pin or roller 142 on an elbow shaped lever arm 143 fulcrumed on shaft 72, the free arm of which is adapted to engage a lug 144 rigidly connected with the hammer lever 50$^a$. This arm is preferably pressed in the direction of the lug by means of a spring 145 to insure quick action when the roller 142 drops on the cam projection. The hammer arm has a slot and pin connection with the hammer lever, thus leaving it free to be actuated by the lever arm 143. The hammer lever 50$^a$ through link 64 actuates pawl 62 which, through ratchet wheel 61 moves the record ribbon.

Cam wheel 150 (Figs. 13, 15) is provided with a cam groove 151 in which rides a pin or roller 152 carried by a lever arm 153 pivotally connected with shaft 95. Rotation of the cam first moves the shaft longitudinally to bring the type selecting frames 97 into operative alinement with arms 100 on the type carriers, and then moves the rock shaft in reverse direction to restore the type selecting frames to their idle position.

The sequence of operations is as follows: Cam wheel 110, acting through lever arms 113, links 115, arms 116 and dogs 118, disconnects arms 69 from the type carriers. At the same time cam 120, acting through arms 123 and 125 and cams 127, disengages the type carriers from the links 36 and 36$^a$. At the same time cam 150, acting through lever arm 153 and shaft 95, moves the type selecting frames 97 into alinement with arms 100 on the type carriers. Then cam 110, continuing its motion, depresses arms 101 bringing the type selecting arms 98 into engagement with the steps on the adding wheels. Thereupon cam 140, through lever arm 143, actuates the hammer lever, thereby printing the totals. Actuation of the hammer lever, through link 64, actuates the spring pawl and moves the record strip one step. Cam 130 acting through arms 133 restores the type carriers to their idle positions, and further movement of cams 110, 120, 140 and 150 restores the other mechanism to its original position, and places it under the domination of the links 36, 36$^a$, and the mechanism which actuates them.

*Locking mechanism.*—It is desirable to have the mechanism, which positions the type selecting fingers, properly centered, locked in position during the printing operation and released when the printing is completed. To accomplish this shaft 44 (Figs. 1-4) carries a cam wheel 160 adapted to actuate a lever arm 161 fixed to a rock shaft 162. The rock shaft carries a lever arm 163 which carries a dog 164 adapted to engage with the notches in a rack 165 having angular teeth and fixed to, or integral with, cogged wheel 26 which actuates the rack bar 27. It is also desirable to have the mechanism which positions the rate bars properly centered, locked in position while the printing is being performed and released when the printing is completed. To accomplish this shaft 44 (Figs. 1, 3, 4) carries a cam wheel 170 adapted to actuate a lever arm 171 which carries dogs 172 adapted to engage with the walls of one of the projections between the notches in one of the sprocket wheels 6. The initial movement of shaft 44 brings dog 164 into engagement with the rack on wheel 26, thereby justifying and locking the mechanism which positions the type selectors, 21 and 21$^a$, and also brings dogs 172 into engagement with wheel 6, thereby justifying and locking the rate positioning mechanism. It is also desirable to mechanically stop the operation of the shaft 40, which sets in motion the printing, recording and adding mechanism, when an operation is completed and release it for another operation, and this should be accomplished automatically. It will be remembered that it requires two revolutions of this shaft to complete the sequence of operations dependent upon its motion. Consequently its motion should be stopped at the end of two revolutions and immediately released. For accomplishing this, shaft 40 (Figs. 3, 6, 29, 30) is provided with a pinion 175, meshing with a spur gear 176 mounted upon a stud shaft 177. Spur gear 176 carries a cam wheel 180 adapted to engage a lug 181$^a$ on a frame 181 and thereby lift and drop the frame which carries a dog 182 adapted to engage with an abutment or stop 183. A dog 184 carried by shaft 40 is so mounted as to engage with dog 182 as it reaches its highest point and hold it in engagement with stop 183, so long as pressure is applied to rotate the shaft. This blocks the movement of dog 184 and consequently stops the rotation of shaft 40. When the pressure, exerted by the hand wheel, is released frame 181 drops out of engagement with dog 184, and leaves shaft 40 free for another operation. It is also desirable to lock the totaling mechanism against operation while the other mechanism is in operation, and to lock the other mechanism against operation while the totaling mechanism is in operation. For this purpose I mount upon shaft 109 (Figs. 4, 21, 31, 32) a wheel 190 having a cam projection 191 adapted to engage with a shoulder 193 on a slidably mounted rod 192 normally occupying a position, indicated by dotted lines, in the path of travel of the crank arm 106 on shaft 105. Rod 192 is pivotally connected with a lever 194 fixed to a rock shaft 195 which carries a dog 196 adapted to take into a notch in a wheel 197 fixed to shaft 44. While the rod 192 is in its normal position dog 196 is out of engagement with the notch in wheel 197 and can only be engaged when a cycle of operation is completed. When the totaling mechanism is to be used, shaft 44 being in its position of rest and dog 196 being in alinement with the notch in wheel 197 rod 192 is moved inward thereby freeing hand wheel 106, and, through lever 194, rocking shaft 195 and throwing dog 196 into engagement with wheel 197 which locks shaft 44 against rotation. As the totaling shaft completes its rotation the cam projection 191 on wheel 190 engages the shoulder 193 on rod 192 and forces the rod outward into the path of travel of crank arm 106, thereby blocking further rotation of the totaling shaft, and, through lever 194 and rock shaft 195, disengaging dog 196 from wheel 197 and releasing shaft 44.

I claim as my invention:

1. The combination in a mechanical calculator of movable type carriers; type movable therein; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; means for bringing the type selecting members into operative alinement with the stepped members denoting any desired multiplier and the corresponding multiple; and means for actuating the type selecting mechanism and the type.

2. The combination in a mechanical calculator of a series of type carriers having movable type; a series of type carriers having movable type adapted to duplicate the printing of the first series; recording mechanism; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; means for bringing the type selecting members into operative alinement with the stepped members denoting any desired multiplier and the corresponding multiple; and means for actuating the type selecting mechanism, the type and the recording mechanism.

3. The combination in a mechanical calculator of movable type carriers; type movable therein; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; and means for actuating the type selecting mechanism and the type.

4. The combination in a mechanical calculator of a series of type carriers having movable type; a series of type carriers having movable type adapted to duplicate the printing of the first series; recording mechanism; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; and means for actuating the type selecting mechanism, the type and the recording mechanism.

5. The combination in a mechanical calculator of a series of movable type carriers; type movable therein, a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; recording mechanism; adding mechanism controlled by the type selecting mechanism; means for bringing the type selecting members into operative alinement with the stepped members denoting any desired multiplier and the corresponding multiple;

means for actuating the type selecting mechanism and the type; totaling mechanism adapted to be connected with and to control the position of the type carriers; means for bringing the totaling mechanism into operative connection with the type carriers; and means for operating the totaling mechanism.

6. The combination in a mechanical calculator of a series of type carriers having movable type; a series of type carriers having movable type adapted to duplicate the printing of the first series; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; recording mechanism; adding mechanism controlled by the type selecting mechanism; means for bringing the type selecting members into operative alinement with the stepped members denoting any desired multiplier and the corresponding multiple; means for actuating the type selecting mechanism and the type; totaling mechanism adapted to be connected with and to control the position of the type carriers; means for bringing the totaling mechanism into operative connection with one series of the type carriers; and means for operating the totaling mechanism.

7. The combination in a mechanical calculator of a series of type carriers having movable type; recording mechanism; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; and means for actuating the type selecting mechanism, the type and the recording mechanism.

8. The combination in a mechanical calculator of a series of type carriers having movable type; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; means for bringing the type selecting members into operative alinement with the stepped members denoting any desired multiplier and the corresponding multiple; recording mechanism; and means for actuating the type selecting mechanism, the type and the recording mechanism.

9. The combination in a mechanical calculator of a series of movable type carriers; type movable therein; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; means for bringing the type selecting mechanism into operative alinement with the stepped members denoting any desired multiplier and the corresponding multiple; and means for actuating the type selecting mechanism and the type.

10. The combination in a mechanical calculator of movable type carriers; type movable therein; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; means for bringing the type selecting mechanism into operative alinement with the stepped members denoting any desired multiplier and the corresponding multiple; recording mechanism; and means for actuating the type selecting mechanism, the type and the recording mechanism.

11. The combination in a mechanical calculator of a series of type carriers having movable type; a series of type carriers having movable type adapted to duplicate the printing of the first series; a traveling carrier carrying independent series of elements each element in a series having steps corresponding to numerals denoting multiples of a selected multiplicand; a series of elements having steps corresponding to numerals denoting selecting multipliers; means for bringing the series denoting multiples of any of the multiplicands into operative alinement with the multiplier series; type selecting mechanism movable relatively to the stepped elements, and adapted by engagement with the steps to control the position of the type carriers; means for bringing the type selecting mechanism into operative alinement with the stepped members denoting any desired multiplier and the corresponding multiple; recording mechanism; and means for actuating the type selecting mechanism, the type and the recording mechanism.

12. The combination in a mechanical calculator of a series of movable type carriers; type movable therein; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; and means for actuating the type selecting mechanism and the type.

13. The combination in a mechanical calculator of a series of movable type carriers; type movable therein; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; recording mechanism; and means for actuating the type selecting mechanism, the type and the recording mechanism.

14. The combination in a mechanical calculator of a series of type carriers having movable type; a series of type carriers having movable type adapted to duplicate the printing of the first series; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; recording mechanism; and means for actuating the type selecting mechanism, the type and the recording mechanism.

15. The combination in a mechanical calculator of a series of movable type carriers; type movable therein; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; means for actuating the type selecting mechanism, and the type; totaling mechanism adapted to be connected with and to control the position of the type carriers; means for bringing the totaling mechanism into operative connection with the type carriers; and means for operating the totaling mechanism.

16. The combination in a mechanical calculator of a series of type carriers; type movable therein; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; recording mechanism; adding mechanism controlled by the type selecting mechanism; means for bringing the type selecting members into operative alinement with the 13 stepped members denoting any desired multiplier and the corresponding multiple; means for actuating the type selecting mechanism and the type; totaling mechanism adapted to be connected with and to control the position of the type carriers; means for bringing the totaling mechanism into operative connection with the type carriers; and means for operating the totaling mechanism.

17. The combination in a mechanical calculator of a series of type carriers; type movable therein; a series of type carriers having movable type adapted to duplicate the printing of the first series; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; recording mechanism; adding mechanism controlled by the type selecting mechanism; means for bringing the type selecting members into operative alinement with the stepped members denoting any desired multiplier and the corresponding multiple; means for actuating the type selecting mechanism and the type; totaling mechanism adapted to be connected with and to control the position of the type carriers; means for bringing the totaling mechanism into operative connection with one series of the type carriers; and means for operating the totaling mechanism.

18. The combination in a mechanical calculator of movable type carriers; type movable therein; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; a hand lever connected with and adapted to position the type selecting mechanism; a movable plate graduated to correspond with the selected multipliers; and means for actuating the type selecting mechanism and the type.

19. The combination in a mechanical calculator of movable type carriers; type movable therein; a series of elements having steps corresponding to numerals denoting multiples of a selected multiplicand; a series of elements having steps corresponding to numerals denoting selected multipliers; type selecting mechanism movable relatively to the stepped elements, and adapted by engagement with the steps to control the position of the type carriers; a hand lever connected with and adapted to position the type selecting mechanism; a movable plate graduated to correspond with the selected multipliers, the graduation being such that movement of the hand lever one step relatively to the scale moves the type selecting mechanism a distance equal to that between the centers of two adjacent stepped elements; and means for actuating the type selecting mechanism and the type.

20. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shaft; means for actuating the rack bar; means for actuating the rock shafts to bring the finger arms into engagement with the stepped elements; type carriers; type movable therein; a connection between the rock shafts and the type carriers whereby actuation of the rock shafts actuates the type carriers; and means for actuating the type.

21. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; type carriers; type movable therein; a connection between the rock shafts and the type carriers whereby actuation of the rock shafts actuates the type carriers; and means for actuating the type.

22. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; type carriers, type movable therein; a connection between the rock shafts and the type carriers whereby actuation of the rock shafts actuates the type carriers; adding mechanism; a connection between the rock shafts and the adding mechanism whereby actuation of the rock shafts actuates the adding mechanism; and means for actuating the type.

23. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; type carriers; type movable therein; a connection between the rock shafts and the type carriers whereby actuation of the rock shafts actuates the type carriers; adding mechanism; a connection between the rock shafts and the adding mechanism whereby actuation of the rock shafts actuates the adding mechanism; totaling mechanism adapted to be connected with and to control the position of the type carriers; means for bringing the totaling mechanism into operative connection with the type carriers; and means for operating the totaling mechanism and the type.

24. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; type carriers; type movable therein; a connection between the rock shafts and the type carriers whereby actuation of the rock shafts actuates the type carriers; recording mechanism; and means for actuating the recording mechanism and the type.

25. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; type carriers; type movable therein; a connection between the rock shafts and the type carriers whereby actuation of the rock shafts actuates the type carriers; adding mechanism; a connection between the rock shafts and the adding mechanism whereby actuation of the rock shafts actuates the adding mechanism; recording mechanism; and means for actuating the recording mechanism and the type.

26. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; type carriers; type movable therein; a connection between the rock shafts and the type carriers whereby actuation of the rock shafts actuates the type carriers; adding mechanism; a connection between the rock shafts and the adding mechanism whereby actuation of the rock shafts actuates the adding mechanism; recording mechanism; totaling mechanism adapted to be connected with and to control the position of the type carriers; means for bringing the totaling mechanism into operative connection with the type carriers; and means for operating the recording mechanism, the totaling mechanism and the type.

27. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; a series of type carriers; type movable therein; a second series of type carriers; type movable therein, the type of the second series being arranged to duplicate the printing of those in the first series; a connection between the rock shafts and the type carriers whereby actuation of the rock shafts actuates both series of type carriers; recording mechanism; and means for actuating the recording mechanism and the type.

28. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; a series of type carriers; type movable therein; a second series of type carriers; type movable therein, the type of the second series being arranged to duplicate the printing of those in the first series; a connection between the rock shafts and the type carriers whereby actuation of the rock shafts actuates both series of type carriers; adding mechanism; a connection between the rock shafts and the adding mechanism whereby actuation of the rock shafts actuates the adding mechanism; and means for actuating the type.

29. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; a series of type carriers; type movable therein; a second series of type carriers; type movable therein, the type of the second series being arranged to duplicate the printing of those in the first series; a connection between the rock shafts and the type carriers whereby actuation of the rock shafts actuates both series of type carriers; adding mechanism; a connection between the rock shafts and the adding mechanism whereby actuation of the rock shafts actuates the adding mechanism; recording mechanism; and means for actuating the recording mechanism and the type.

30. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; means for actuating the rock shafts to bring the finger arms into engagement with the stepped elements; a series of type carriers; type movable therein; a second series of type carriers; type movable therein, the type of the second series being arranged to duplicate the printing of those in the first series; a connection between the rock shafts and the type carriers whereby actuation of the rock shafts actuates both series of type carriers; and means for actuating the type.

31. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; means for actuating the rock shafts to bring the finger arms into engagement with the stepped elements; a series of type carriers; type movable therein; a second series of type carriers; type movable therein, the type of the second series being arranged to duplicate the printing of those in the first series; a connection between the rock shafts and the type carriers whereby actuation of the rock shafts actuates both series of type carriers; adding mechanism; a connection between the rock shafts and the adding mechanism whereby actuation of the rock shafts actuates the adding mechanism; and means for actuating the type.

32. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; means for actuating the rock shafts to bring the finger arms into engagement with the stepped elements, a series of type carriers; type movable therein; a second series of type carriers; type movable therein, the type of the second series being arranged to duplicate the printing of those in the first series; a connection between the rock shafts and the type carriers whereby actuation of the rock shafts actuates both series of type carriers; adding mechanism; a connection between the rock shafts and the adding mechanism whereby actuation of the rock shafts actuates the adding mechanism; recording mechanism; and means for actuating the recording mechanism and the type.

33. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; levers fixed to the rock shafts and connected with the type carriers; yielding means for actuating the levers; and means for actuating the type.

34. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; adding mechanism; levers fixed to the rock shafts and connected with and adapted to actuate the type carriers and the adding mechanism; yielding means for actuating the levers, and means for actuating the type.

35. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; recording mechanism; levers fixed to the rock shafts and connected with the type carriers; yielding means for actuating the levers; and means for actuating the recording mechanism and the type.

36. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; recording mechanism; adding mechanism; levers fixed to the rock shafts and connected with and adapted to actuate the type carriers and the adding mechanism; yielding means for actuating the levers; and means for actuating the recording mechanism and the type.

37. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; a second series of type carriers; type movable therein, the type of the second series being arranged to duplicate the printing of those in the first series; recording mechanism; levers fixed to the rock shafts and connected with both series of type carriers; yielding means for actuating the levers; and means for actuating the type and the recording mechanism.

38. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; a second series of type carriers; type movable therein, the type of the second series being arranged to duplicate the printing of those in the first series; recording mechanism; adding mechanism; levers fixed to the rock shafts and connected with and adapted to actuate both series of type carriers and the adding mechanism; yielding means for actuating the levers; and means for actuating the type.

39. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; levers fixed to the rock shafts and connected with the type carriers; a movable frame carrying yielding plungers adapted to engage with and actuate the levers; a cam wheel adapted to actuate the movable frame; and means for actuating the cam wheel and the type.

40. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; a gear wheel adapted to actuate the rack bar; a hand lever adapted to actuate the gear wheel; means for actuating the rock shafts to bring the finger arms into engagement with the stepped elements; type carriers; type movable therein; a connection between the rock shafts and the type carriers whereby actuation of the rock shafts actuates the type carriers; and means for actuating the type.

41. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; a gear wheel adapted to actuate the rack bar; a hand lever adapted to actuate the gear wheel; yielding means for actuating the rock shafts to bring the finger arms into engagement with the stepped elements; type carriers; type movable therein; a connection between the rock shafts and the type carriers whereby actuation of the rock shafts actuates the type carriers; and means for actuating the type.

42. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; a gear wheel adapted to actuate the rack bar; a hand lever adapted to actuate the gear wheel; a movable plate graduated to correspond with the selected multipliers, the graduation being such that movement of the hand lever one step relatively to the scale moves the finger arms a distance equal to that between the centers of two adjacent stepped elements; means for actuating the rock shafts to bring the finger arms into engagement with the stepped elements; type carriers; type movable therein; a connection between the rock shafts and the type carriers whereby actuation of the rock shafts actuates the type carriers; and means for actuating the type.

43. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; a hand lever connected with and adapted to position the type selecting mechanism; a movable plate graduated to correspond with the selected multipliers; and means for actuating the type selecting mechanism and the type.

44. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; a hand lever connected with and adapted to position the type selecting mechanism; a movable plate graduated to correspond with the selected multipliers, the graduation being such that movement of the hand lever one step relatively to the scale moves the type selecting mechanism a distance equal to that between the centers of two adjacent stepped elements; and means for actuating the type selecting mechanism and the type.

45. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; means for actuating the rock shafts to bring the finger arms into engagement with the stepped elements; a connection between the rock shafts and the type carriers whereby actuation of the rock shafts actuates the type carriers; and means for actuating the type.

46. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; yielding means for actuating the rock shafts to bring the finger arms into engagement with the stepped elements; type carriers; type movable therein; a connection between the rock shafts and the type carriers whereby actuation of the rock shafts actuates the type carriers; and means for actuating the type.

47. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; levers fixed to the rock shafts and connected with the type carriers; yielding means for actuating the levers; and means for actuating the type.

48. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; recording mechanism; levers fixed to the rock shafts and connected with the type carriers; yielding means for actuating the levers; and means for actuating the recording mechanism and the type.

49. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; a second series of type carriers; type movable therein, the type of the second series being arranged to duplicate the printing of those in the first series; recording mechanism; levers fixed to the rock shafts and connected with both series of type carriers; yielding means for actuating the levers; and means for actuating the type and the recording mechanism.

50. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; adding mechanism; levers fixed to the rock shafts and connected with and adapted to actuate the type carriers and the adding mechanism; yielding means for actuating the levers; and means for actuating the type.

51. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; a second series of type carriers; type movable therein, the type of the second series being arranged to duplicate the printing of those in the first series; recording mechanism; adding mechanism; levers fixed to the rock shafts and connected with and adapted to actuate both series of type carriers and the adding mechanism; yielding means for actuating the levers; and means for actuating the type.

52. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; levers fixed to the rock shafts and connected with the type carriers; a movable frame carrying yielding plungers adapted to engage with and actuate the levers; a cam wheel adapted to actuate the movable frame; and means for actuating the cam wheel and the type.

53. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; levers fixed to the rock shafts; links connecting the levers and the type carriers; yielding means for actuating the levers; and means for actuating the type.

54. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; a second series of type carriers; type movable therein, the type of the second series being arranged to duplicate the printing of those in the first series; recording mechanism; levers fixed to the rock shafts; links connecting the levers with both series of type carriers; yielding means for actuating the levers; and means for actuating the type and the recording mechanism.

55. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; type carriers; type movable therein; levers fixed to the rock shafts and connected with the type carriers; a movable frame carrying yielding plungers adapted to engage with and actuate the levers; a cam wheel adapted to actuate the movable frame; and means for actuating the cam wheel and the type.

56. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; a gear wheel adapted to actuate the rack bar; a hand lever adapted to actuate the gear wheel; type carriers; type movable therein; levers fixed to the rock shafts and connected with the type carriers; a movable frame carrying yielding plungers adapted to engage with and actuate the levers; a cam wheel adapted to actuate the movable frame; and means for actuating the cam wheel and the type.

57. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for actuating the carrier to bring the series denoting multiples of any of the multiplicands into operative alinement with the multiplier series; rock shafts mounted parallel with the series of stepped elements; finger arms splined on the rock shafts and adapted to engage steps on the stepped elements; a rack bar carrying a frame adapted to move the finger arms longitudinally of the rock shafts; means for actuating the rack bar; type carriers; type movable therein; levers fixed to the rock shafts and connected with the type carriers; a movable frame carrying yielding plungers adapted to engage with and actuate the levers; a cam wheel adapted to actuate the movable frame; and means for actuating the cam wheel and the type.

58. The combination in a mechanical calculator of a series of movable type carriers; type movable therein; a shaft; sprocket wheels mounted thereon; sprocket chains carried thereby; a series of bars carried by the chains each bar carrying a series of elements having steps corresponding to numerals denoting multiples of a selected multiplicand; a series of elements having steps corresponding to numerals denoting selected multipliers; means for rotating the shaft to bring any series of stepped elements denoting multiples into juxtaposition with the series denoting multipliers; an indicator chain adapted to be actuated by the carrier shaft and carrying numerals corresponding to the selected series of multiplicands; type selecting mechanism movable relatively to the stepped elements, and adapted by engagement with the steps to control the position of the type carriers; means for bringing the type selecting members into operative alinement with the stepped members denoting any desired multiplier and the corresponding multiple; and means for actuating the type selecting mechanism and the type.

59. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; levers fixed to the rock shafts and connected with the type carriers; a movable frame carrying yielding plungers adapted to engage with and actuate the levers; a shaft; means for rotating the shaft; a cam wheel on the shaft adapted to actuate the movable frame; and means operated by the shaft, for actuating the type.

60. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; levers fixed to the rock shafts; a connection between the levers and the type carriers whereby actuation of the levers actuates the type carriers; a movable frame carrying yielding plungers adapted to engage with and actuate the levers; a shaft; means for rotating the shaft; a cam wheel on the shaft adapted to actuate the movable frame; a lever arm carrying hammers adapted to engage with and actuate the type; a movable platen; and means, operated by the shaft, for actuating the hammer and the platen.

61. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; rock shafts mounted parallel with the series of stepped elements; finger arms splined on the rock shafts and adapted to engage steps on the stepped elements; means for bringing the finger arms into operative alinement with the stepped members denoting any desired multiplier and the corresponding multiple; a series of type carriers; type movable therein; levers fixed to the rock shafts; a connection between the levers and the type carriers whereby actuation of the levers actuates the type carriers; a movable frame carrying yielding plungers adapted to engage with and actuate the levers; a shaft; means for rotating the shaft; a cam wheel on the shaft adapted to actuate the movable frame; a lever arm carrying hammers adapted to engage with and actuate the type; recording mechanism; a movable platen; and means, operated by the shaft, for actuating the recording mechanism, the hammer and the platen.

62. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; a shaft; means for rotating the shaft; and means operated by the shaft for actuating the type selecting mechanism and the type.

63. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; a lever arm carrying hammers adapted to engage with and actuate the type; a movable platen; and means, operated by the shaft, for actuating the type selecting mechanism, the hammer arm and the platen.

64. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; recording mechanism; a shaft; means for rotating the shaft; and means, operated by the shaft, for actuating the recording mechanism, the type selecting mechanism and the type.

65. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; adding mechanism; a shaft; means for rotating the shaft; and means, operated by the shaft, for actuating the adding mechanism, the type selecting mechanism and the type.

66. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; recording mechanism; adding mechanism; a shaft; means for rotating the shaft; and means, operated by the shaft, for actuating the recording mechanism, the type selecting mechanism, the type, and the adding mechanism.

67. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; a second series of type carriers; type movable therein, the type of the second series being arranged to duplicate the printing of those in the first series; type selecting mechanism movable relatively to the stepped elements, and adapted by engagement with the steps to control the position of the type carriers; recording mechanism; a shaft; means for rotating the shaft; and means, operated by the shaft, for actuating the recording mechanism, the type selecting mechanism and the type.

68. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; a second series of type carriers; type movable therein, the type of the second series being arranged to duplicate the printing of those in the first series; type selecting mechanism movable relatively to the stepped elements, and adapted by engagement with the steps to control the position of the type carriers; recording mechanism; adding mechanism; a shaft; means for rotating the shaft; and means, operated by the shaft, for actuating the recording mechanism, the type selecting mechanism, the type and the adding mechanism.

69. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; a shaft; means for rotating the shaft; a cam wheel on the shaft; a lever arm carrying hammers adapted to engage with and actuate the type; an arm pivotally attached to the hammer arm and spring pressed against the cam; and means, operated by the shaft, for actuating the type selecting mechanism.

70. In a calculating machine a series of movable type carriers; type movable therein; means for actuating the type carriers and the type; a series of segmental racks; a connection between each of the type carriers and a segmental rack whereby actuation of the type carriers actuates the rack; a pinion meshing with the rack; a disk carried by the pinion; a pawl carried by the disk; a ratchet wheel adapted to be driven by the pawl; an adding wheel carried by the ratchet wheel and having steps denoting numerals; and means for carrying numerals of one order from one adding wheel to another.

71. In a calculating machine a series of movable type carriers; type movable therein; means for actuating the type carriers and the type; a series of segmental racks; a connection between each of the type carriers and a segmental rack whereby actuation of the type carriers actuates the rack; a pinion meshing with the rack; a disk carried by the pinion; a pawl carried by the disk; a ratchet wheel adapted to be driven by the pawl; an adding wheel carried by the ratchet wheel and having steps denoting numerals; a pin carried by the adding wheel; a lever adapted to be engaged and actuated by the pin; a pawl, carried by the lever, adapted to engage with the risers of the adding wheel and to be advanced by action of the pin on the lever and retracted by reverse movement of the lever; and means for imparting reverse movement to the lever.

72. In a calculating machine a series of movable type carriers; type movable therein; means for actuating the type carriers and the type; a series of segmental racks; a connection between each of the type carriers and a segmental rack whereby actuation of the type carriers actuates the rack; a pinion meshing with the rack; a disk carried by the pinion; a pawl carried by the disk; a ratchet wheel adapted to be driven by the pawl; an adding wheel carried by the ratchet wheel and having steps denoting numerals; a pin carried by the adding wheel; a lever loosely mounted upon a rock shaft and adapted to be engaged and actuated by the pin; a pawl carried by the lever adapted to engage with the risers of the adding wheel of the next order and to be advanced by action of the pin upon the lever and retracted by the reverse movement of the lever; an arm fixed to the rock shaft and adapted to be engaged by the lever; a cam wheel; a lever adapted to be actuated by the cam; a link connecting the lever with the fixed arm; and means for rotating the cam wheel.

73. The combination in a mechanical calculator of a series of movable type carriers; type movable therein; means for actuating the type carriers; a series of adding wheels having steps denoting numerals; a detachable connection between the type carriers and the adding wheels whereby actuation of the type carriers may actuate the adding wheels; a series of totaling frames having arms adapted to engage with the steps on the adding wheels; a detachable connection between the totaling frames and the type carriers whereby actuation of the totaling frames may actuate the type carriers; means for disengaging the adding wheels and the type carriers; means for engaging the totaling frames and the type carriers; and means for actuating the totaling frames and the type.

74. The combination in a mechanical calculator of a series of movable type carriers; type movable therein; means for actuating the type carriers; a series of adding wheels having steps denoting numerals; a detachable connection between the type carriers and the adding wheels whereby actuation of the type carriers may actuate the adding wheels; a series of totaling frames having arms adapted to engage with the steps on the adding wheels; a detachable connection between the totaling frames and the type carriers whereby actuation of the totaling frames may actuate the type carriers; means for disengaging the adding wheels and the type carriers; and yielding means for actuating the totaling frames and the type.

75. The combination in a mechanical calculator of a series of movable type carriers; type movable therein; means for actuating the type carriers; a series of adding wheels having steps denoting numerals; a detachable connection between the type carriers and the adding wheels whereby actuation of the type carriers may actuate the adding wheels; a series of totaling frames having arms adapted to engage with the steps on the adding wheels; a detachable connection between the totaling frames and the type carriers whereby actuation of the totaling frames may actuate the type carriers; means for disengaging the adding wheels and the type carriers; recording mechanism; and means for actuating the totaling frames, the recording mechanism and the type.

76. The combination in a mechanical calculator of a series of movable type carriers; type movable therein; means for actuating the type carriers; a series of adding wheels having steps denoting numerals; a detachable connection between the type carriers and the adding wheels whereby actuation of the type carriers may actuate the adding wheels; a series of totaling frames having arms adapted to engage with the steps on the adding wheels; a detachable connection between the totaling frames and the type carriers whereby actuation of the totaling frames may actuate the type carriers; a shaft; means for rotating the shaft; means operated by the shaft for disengaging the type carriers and the adding wheels, for engaging the type carriers and the totaling frames, and for actuating the totaling frames and the type.

77. The combination in a mechanical calculator of a series of movable type carriers; type movable therein; means for actuating the type carriers; a series of adding wheels having steps denoting numerals; a detachable connection between the type carriers and the adding wheels whereby actuation of the type carriers may actuate the adding wheels; a series of totaling frames having arms adapted to engage with the steps on the adding wheels; a detachable connection between the totaling frames and the type carriers whereby actuation of the totaling frames may actuate the type carriers; a shaft; means for rotating the shaft; means operated by the shaft for disengaging the type carriers and the adding wheels, for engaging the type carriers and the totaling frames, for actuating the totaling frames and the type, for disengaging the type carriers and the totaling frames, and for re-engaging the type carriers and the adding wheels.

78. The combination in a mechanical calculator of a series of movable type carriers; type movable therein; means for actuating the type carriers; a series of adding wheels having steps denoting numerals; a detachable connection between the type carriers and the adding wheels whereby actuation of the type carriers may actuate the adding wheels; an arm extending from each of the type carriers; a series of totaling frames mounted upon a longitudinally movable shaft each frame having an arm adapted to engage with the steps of an adding wheel and an arm adapted to be engaged by the arm on the type carrier; a detachable connection between the totaling frames and the type carriers whereby actuation of the totaling frames may actuate the type carriers; means for disengaging the adding wheels and the type carriers; means for moving the shaft, which carries the totaling frames, longitudinally to bring the totaling frames into alinement with the arms on the type carriers and means for actuating the totaling frames and the type.

79. The combination in a mechanical calculator of a series of movable type carriers; type movable therein; means for actuating the type carriers; a series of adding wheels having steps denoting numerals; a detachable connection between the type carriers and the adding wheels whereby actuation of the type carriers may actuate the adding wheels; an arm extending from each of the type carriers; a series of totaling frames mounted upon a longitudinally movable shaft each frame having an arm adapted to engage with the steps of an adding wheel and an arm adapted to be engaged by the arm on the type carrier; a detachable connection between the totaling frames and the type carriers whereby actuation of the totaling frames may actuate the type carriers; a shaft; means for rotating the shaft; and means operated by the shaft for disengaging the type carriers and the adding wheels, for moving the shaft, which carries the totaling frames, longitudinally to bring the totaling frames into alinement with the arms on the type carriers, and for actuating the totaling frames and the type.

80. The combination in a mechanical calculator of a series of type carriers loosely mounted upon a shaft; type movable therein; a series of adding wheels having steps denoting numerals; a detachable connection between the type carriers and the adding wheels whereby actuation of the type carriers may actuate the adding wheels; a series of totaling frames having arms adapted to engage with the steps on the adding wheels; a detachable connection between the totaling frames and the type carriers whereby actuation of the totaling frames may actuate the type carriers; means, including a slot and pin connection, for actuating the type carriers; a series of cams loosely mounted upon the type carrier shaft adapted to engage with the pins; an arm extending from the cam; a shaft; means for rotating the shaft; a cam wheel on the shaft; a lever fixed to a rock shaft and adapted to be actuated by the cam wheel; a lever carried by the rock shaft, a rod carried by the lever and engaging with the arms of the cams upon the type carrier shaft; and means for disengaging the type carriers and the adding wheels, and for actuating the totaling frames and the type.

81. The combination in a mechanical calculator of a series of type carriers loosely mounted upon a shaft; type movable therein; detachable means for actuating the type carriers; a series of adding wheels having steps denoting numerals; a series of segmental racks loosely mounted upon a shaft and adapted to actuate the adding wheel; a link detachably connecting each type carrier with a segmental rack; a dog loosely mounted upon the shaft carrying the segmental racks and adapted to engage with the link connecting the type carrier and the segmental rack; a shaft; means for rotating the shaft; a cam wheel carried by the shaft; a lever adapted to be actuated by the cam wheel, and to engage with and actuate the dog; a series of totaling frames having arms adapted to engage with the steps on the adding wheels; means for engaging the totaling frames with the type carriers; means for disengaging the type carriers from their primary actuating mechanism; and means for actuating the totaling frames and the type.

82. The combination in a mechanical calculator of a series of type carriers loosely mounted upon a shaft; type movable therein; detachable means for actuating the type carriers; a series of adding wheels having steps denoting numerals, a series of segmental racks loosely mounted upon a shaft and adapted to actuate the adding wheels; a link detachably connecting each type carrier with a segmental rack; an arm depending from the type carrier; a boss, slidably mounted upon the arm; a spring held between the boss and a fixed abutment on the arm; a dog loosely mounted upon the shaft carrying the segmental racks and adapted to engage with the link connecting the type carrier and the segmental rack; a shaft; means for rotating the shaft; a cam wheel carried by the shaft; a lever adapted to be actuated by the cam wheel, and to engage with and actuate the dog, and to engage with the boss and actuate the spring arm; a series of totaling frames having arms adapted to engage with the steps on the adding wheels; means for engaging the totaling frames with the type carriers; means for disengaging the type carriers from their primary actuating mechanism; and means for actuating the type.

83. The combination in a mechanical calculator of a series of elements having steps corresponding to numerals denoting multiples of a selected multiplicand; a series of elements having steps corresponding to numerals denoting selected multipliers; rock shafts mounted parallel with the series of stepped elements; finger arms splined on the rock shafts and adapted to engage steps on the stepped elements; a rack bar carrying a frame adapted to move the finger arms longitudinally of the rock shafts; a gear wheel adapted to actuate the rack bar; a hand lever adapted to actuate the gear wheel; type carriers; type movable therein; a connection between the rock shafts and the type carriers whereby actuation of the rock shafts actuates the type carriers; a shaft; means for rotating the shaft; and means, controlled by the shaft, for locking the gear wheel in position, for actuating the rock shafts to bring the finger arms into engagement with the stepped elements, for actuating the type and for releasing the gear wheel when the operation is completed.

84. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for actuating the carrier to bring the series denoting multiples of any of the multiplicands into operative alinement with the multiplier series; type selecting mechanism movable relatively to the stepped elements, and adapted by engagement with the steps to control the position of the type carriers; means for bringing the type selecting members into operative alinement with the stepped members denoting any desired multiplier and the corresponding multiple; movable type carriers; type movable therein; a shaft; means for rotating the shaft; and means, controlled by the shaft, for locking the traveling carrier in position, for actuating the type selecting mechanism, the type carriers and the type, and for releasing the traveling carrier.

85. The combination in a mechanical calculator of a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type carriers; type movable therein; type selecting mechanism movable relatively to the stepped elements, and adapted by engagement with the steps to control the position of the type carriers; a shaft; means for rotating the shaft; means operated by the shaft for actuating the type selecting mechanism and the type; and means, controlled by the operating means, for locking and releasing the shaft when the operation is completed.

86. The combination in a mechanical calculator of a series of movable type carriers; type movable therein; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; means for actuating the type selecting mechanism, and the type; totaling mechanism adapted to be connected with and to control the position of the type carriers; means for bringing the totaling mechanism into operative connection with the type carriers; means for operating the totaling mechanism; and means for locking the adding mechanism while the totaling mechanism is in operation and releasing it when the totaling operation is completed.

87. The combination in a mechanical calculator of a series of movable type carriers; type movable therein; a traveling carrier carrying independent series of elements each element in a series having steps corresponding to numerals denoting multiples of a selected multiplicand; a series of elements having steps corresponding to numerals denoting selected multipliers; means for bringing the series denoting multiples of any of the multiplicands into operative alinement with the multiplier series; type selecting mechanism movable relatively to the stepped elements, and adapted by engagement with the steps to control the position of the type carriers; adding mechanism controlled by the type selecting mechanism; means for bringing the type selecting members into operative alinement with the stepped members denoting any desired multiplier and the corresponding multiple; means for actuating the type selecting mechanism, and the type; totaling mechanism adapted to be connected with and to control the position of the type carriers; means for bringing the totaling mechanism into operative connection with the type carriers; means for operating the totaling mechanism; and means for locking the totaling mechanism while the adding mechanism is in operation.

88. The combination, in a calculating machine, of members adapted to print elapsed time; an actuating member; gearing operated by the actuating member and adapted to so correlate the printing members that they will print elapsed time in accordance with the position of the actuating member relatively to a predetermined zero point in its path of travel; and a gage graduated in time periods and adjustable relatively to the zero point whereby the beginning time for any calculation may be made to correspond to the zero point, and the calculation of elapsed time made by moving the actuating member from the position it may happen to occupy to a position determined by the ending time as denoted by the gage.

89. A computing machine including elapsed time and wage printing mechanism; a stationary pointer; and two members movable in respect to said pointer, the first member being a circular scale divided into time intervals representing hours and fractions thereof, the second member being adapted through gearing to cause the said printing mechanism to be positioned to print elapsed time and the corresponding wage in accordance with the relative movements of the two said members as compared with the said pointer.

90. The combination, in a calculating machine, of members adapted to print elapsed time; an actuating member; gearing actuated by the actuating member and adapted to so correlate the printing members that they will print elapsed time in accordance with the position of the actuating member, in its arc of travel, relatively to a predetermined zero point; and an arc shaped gage graduated in time periods, and adjustable relatively to the zero point, whereby the beginning time for any calculation may be made to correspond with the zero point, and the calculation of elapsed time made by moving the actuating member from the position it may happen to occupy to a position denoted by the ending time as denoted by the gage.

91. The combination, in a calculating machine, of members adapted to print elapsed time and wages; gearing operated by the actuating member and adapted to so correlate the printing members that they will print elapsed time and corresponding wages in accordance with the position of the actuating member relatively to a predetermined zero point in its path of travel; and a gage graduated in time periods and adjustable relatively to the zero point whereby the beginning time for any calculation may be made to correspond with the zero point and the calculation made by moving the actuating member from the position it may happen to occupy to a position determined by the ending time as denoted by the gage.

92. The combination, in a calculating machine, of members adapted to print elapsed time and wages; an actuating member; gearing operated by the actuating member and adapted to so correlate the printing members that they will print elapsed time and corresponding wages in accordance with the position of the actuating member relatively to a predetermined zero point in its arc of travel; and an arc shaped gage graduated in time periods and adjustable relatively to the zero point whereby the beginning time for any calculation may be made to correspond with the zero point and the calculation made by moving the actuating member from the position it may happen to occupy to a position determined by the ending time as denoted by the gage.

FRANK E. WEBNER.

Witnesses:
AGNES B. GRANT,
W. W. SYMMES.